United States Patent
Dvortsov

(10) Patent No.: US 9,794,402 B2
(45) Date of Patent: Oct. 17, 2017

(54) UPDATING DEVICE BEHAVIOR BASED ON USER BEHAVIOR

(71) Applicant: APPLE INC., Cupertino, CA (US)

(72) Inventor: Eugene Dvortsov, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/595,039

(22) Filed: Jan. 12, 2015

(65) Prior Publication Data

US 2016/0205244 A1     Jul. 14, 2016

(51) Int. Cl.
| | |
|---|---|
| *H04M 3/42* | (2006.01) |
| *H04L 29/08* | (2006.01) |
| *H04W 4/02* | (2009.01) |
| *H04W 4/16* | (2009.01) |
| *H04M 19/04* | (2006.01) |
| *H04M 3/436* | (2006.01) |
| *H04M 3/533* | (2006.01) |

(52) U.S. Cl.
CPC ........ *H04M 3/42365* (2013.01); *H04L 67/22* (2013.01); *H04M 3/4365* (2013.01); *H04M 3/53308* (2013.01); *H04M 19/04* (2013.01); *H04W 4/027* (2013.01); *H04W 4/16* (2013.01)

(58) Field of Classification Search
CPC .............................. H04M 1/6041; H04W 68/00
USPC ........... 455/557, 566, 575.6, 413, 95, 414.1, 455/556.1
See application file for complete search history.

(56) References Cited

U.S. PATENT DOCUMENTS

| | | | |
|---|---|---|---|
| 7,130,664 B1 | 10/2006 | Williams | |
| 2015/0065055 A1* | 3/2015 | Newham | H04W 4/008 455/41.3 |
| 2015/0065893 A1* | 3/2015 | Ye | A61B 5/6898 600/483 |
| 2015/0182163 A1* | 7/2015 | Utter | A61B 5/0205 600/301 |
| 2015/0187206 A1* | 7/2015 | Saurin | G08C 17/02 340/5.61 |
| 2015/0350418 A1* | 12/2015 | Rauenbuehler | H04L 63/0823 455/414.1 |
| 2015/0381740 A1* | 12/2015 | Gwin | H04L 67/142 709/228 |
| 2016/0026212 A1* | 1/2016 | Lee | G06F 1/163 361/679.03 |
| 2016/0044151 A1* | 2/2016 | Shoemaker | H04M 19/04 455/556.1 |

* cited by examiner

*Primary Examiner* — Cong Tran
(74) *Attorney, Agent, or Firm* — Kilpatrick Townsend & Stockton LLP

(57) ABSTRACT

Systems, methods, and computer-readable medium are provided for updating device behavior based on user behavior. For example, a user device may receive activity information of a user. Based on the activity information, the device may identify a first activity level of the user. The device may receive an indication that a second device is receiving an incoming call. After receiving the indication of the incoming call, the user device may identify a second activity level of the user. The user device may infer the intent of the user with respect to interacting with the second device based on the relative activity levels and may provide instructions to the second device for changing a setting of the second device based on the inferred intent of the user.

19 Claims, 11 Drawing Sheets

UPDATING DEVICE BEHAVIOR BASED ON USER BEHAVIOR

BACKGROUND

Wearable devices and other peripheral user electronics are becoming more and more popular. Such devices may connect via proximity-based network connections to other user devices, for example a headset connecting to a smartphone via a Bluetooth connection. Additionally, these peripheral devices are typically smaller and more portable than traditional consumer electronics. Thus, these peripheral devices may be more regularly accessible by a user (e.g., they may be worn or on a user's person more often). Alternatively, users are often misplacing their portable devices and/or placing them in locations that are not easily accessible. It is relatively common for a user to miss a call being received by their portable electronic device because they are unable to answer the call in time.

BRIEF SUMMARY

Embodiments of the present disclosure can provide systems, methods, and computer-readable medium for updating device behavior (e.g., changing settings of the device) based on user behavior (e.g., changes in activity of the user). In some examples, two user devices (e.g., a portable computing device and a wearable computing device) may communicate with one another over a network connection. While connected, the two devices may share information about incoming calls and the inferred intent of the user with respect to interacting with the incoming calls.

According to one embodiment, a method may be executed by a wearable computer system to at least receive biometric information of the user. The wearable device may also identify a first activity level of the user based at least in part on the biometric information. In some example, the wearable device may receive an indication from the portable computing device of the user that an incoming call is being received by the portable computing device. The wearable device may also identify a second activity level of the user based at least in part on the biometric information after receiving the indication that the incoming call is being received by the portable computing device. Based at least in part on the second activity level of the user relative to the first activity level of the user, the wearable device may infer an intent of the user with respect to the incoming call. The wearable device may also provide instructions to the portable computing device of the user to change a setting associated with the portable computing device based at least in part on the inferred intent.

In some examples, the second activity level may be greater than the first activity level. Additionally, the second activity level being greater than the first activity level may indicate that the user is moving slower during a first time associated with the first activity level than during a second time associated with the second activity level. Alternatively, or in addition, the inferred intent of the user with respect to the incoming call may indicate that the user is attempting to interact with the portable computing device. In some cases, the inferred intent of the user with respect to the incoming call may indicate that the user is attempting to ignore the incoming call when the second activity level is lower than the first activity level. The setting to be changed associated with the portable computing device may comprise a number of rings before a voice message system is initiated.

According to another embodiment, a computer-readable medium executed by a processor of a portable user device may include instructions that, when executed, configure a computer processor to receive first information about a first state of the user from a wearable computing device of the user. The instructions may further configure the processor to receive, while in an active state, an incoming call from a service provider. The instructions may also configure the processor to receive second information about a second state of the user from the wearable computing device. Further, the instructions may configure the processor to determine an intent of the user based at least in part on a relationship between the first state and the second state of the user, and update the behavior of the portable computing device based at least in part on the determined intent of the user.

In some examples, the relationship between the first state and the second state may indicate that the user is attempting to answer the portable computing device. The active state of the portable computing device may comprise not being in a do not disturb mode. Additionally, the wearable computing device may comprise a watch or a headset capable of collecting biometric data associated with the user and/or the updated behavior may comprise extending a number of rings of the portable computing device. In some cases, the number of rings of the portable computing device may be extended by providing instructions to the service provider that instruct the service provider to extend the number of rings prior to enabling a voice message service. The updated behavior may comprise providing a message to a second user that placed the incoming call. Further, in some examples, the message may include a request to the second user, the request enabling the second user to indicate a relative importance of the incoming call and/or the message may indicate the determined intent of the user to the second user.

According to another embodiment, a system may be implemented as a portable computing device configured with a memory and a processor and a wearable computing device configured with a memory and processor. The processor of the portable computing device may be configured to execute instructions stored on the memory of the portable computing device to receive, while in an active state, an incoming call initiated by another device. The processor of the portable computing device may also be configured to provide information to the wearable computing device relating to the incoming call. The processor of the portable computing device may also be configured to receive the instructions, from the wearable computing device, for changing a setting of the portable computing device based at least in part on an identified action of the user. In some examples, the processor of the wearable device may be configured to collect activity information of the user, identify, after the incoming call is received by the portable computing device, the identified action of the user based at least in part on the collected activity information of the user, and/or provide the instructions to the portable computing device to enable the setting of the portable computing device to be changed based at least in part on the identified action.

In some cases, the received instructions for updating the setting may include an instruction to extend a number of rings of the incoming call. Additionally, the incoming call may be received from a service provider, and the instruction to extend the number of rings of the incoming call may be provided, by the portable computing device, to the service provider. In some examples, the identified action may indicate that the user is attempting to interact with the portable computing device. Further, in some aspects, the activity information may be collected by an accelerometer of the wearable computing device.

DETAILED DESCRIPTION

Figure 1:
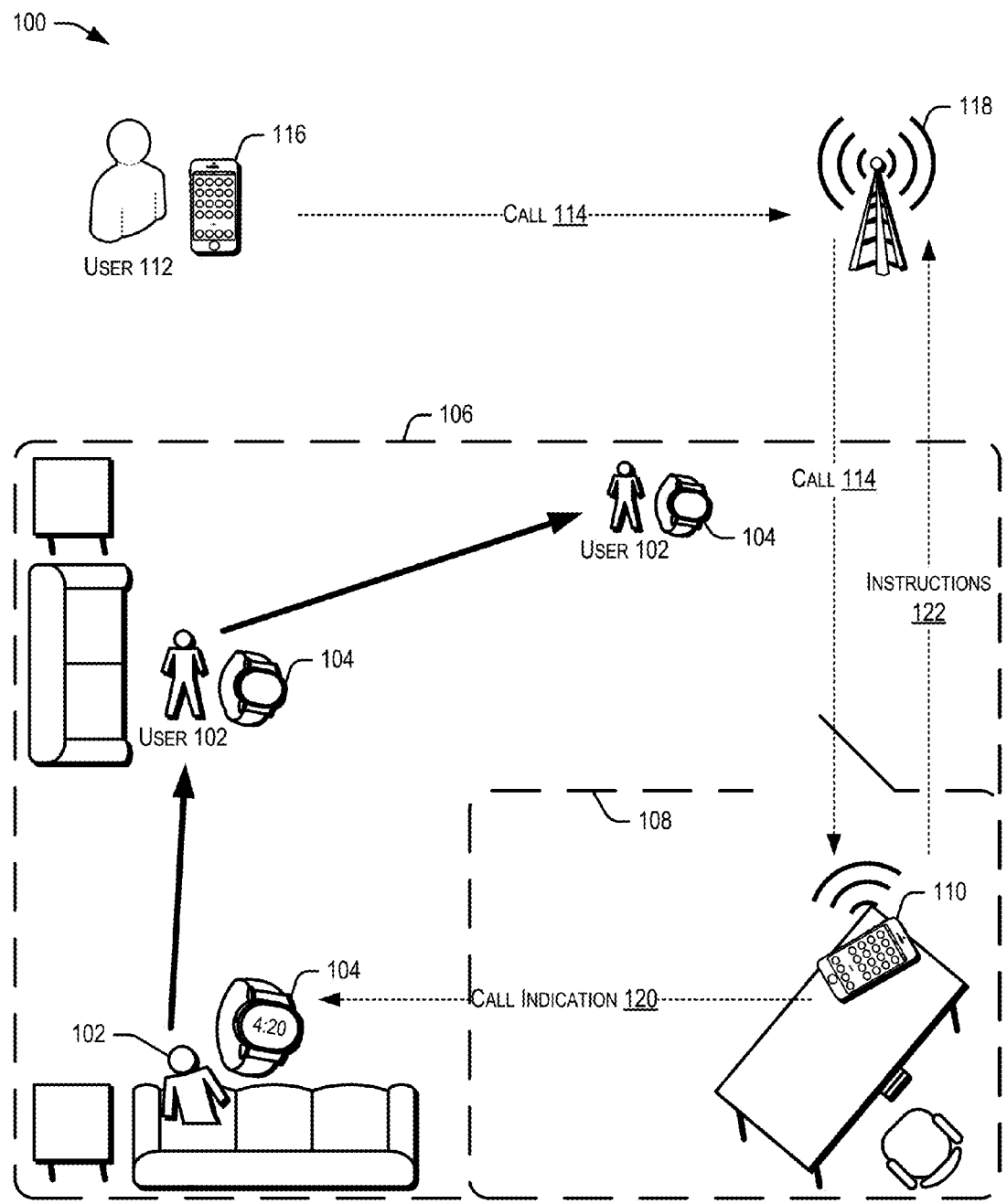
FIG. 1 is a simplified block diagram illustrating at least some example techniques for updating device behavior based on user behavior as described herein, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples of the present disclosure are directed to, among other things, updating portable device behavior of a user based at least in part on (hereinafter, "based on") behavior and/or actions of the user. In particular, a pair of user devices (or more than two) may communicate with one another via a wireless network connection or the like. In some examples, one device may collect user activity information of the user and this information may be used to infer or otherwise determine the intent of the user with respect to the second device. For example, the user may be wearing a peripheral device (e.g., a smart watch, smart glasses, a mobile headset, or the like) that includes one or more sensors configured to detect activity and/or biometric information of the user as the user moves. In some examples, the user may also utilize a portable computing device (e.g., a mobile phone or other communication device) that can receive calls, texts, or other electronic messages from other users. When a communication is received by the user's portable device, this device may provide information to the user's peripheral device indicating that the portable device is receiving the communication.

More specifically, a mobile phone in an active state (e.g., not in a "do not disturb mode") may be receiving a call, and the mobile phone may send information to a smart watch of the user that a call is being received (e.g., that the mobile phone is ringing). If the mobile phone is not active or is in "do not disturb" mode, the mobile phone may be configured to not send any communication about the call to the smart watch or other user device. In one non-limiting example, the smart watch may begin to collect user activity, behavior, and/or other biometric information (assuming that the user is wearing the smart watch) based on receipt of the sent information that indicates the call. The smart watch may be able to identify the intent of the user (e.g., whether the user is trying to interact with the mobile phone, whether the user is trying to ignore the mobile phone, whether the user has lost the mobile phone, whether the user is busy, etc.) and provide instructions to the mobile phone to update a setting or behavior of the mobile phone based at least in part on the determined intent. In some cases, the intent of the user may be inferred or implied based at least in part on the activity of the user that is detected. For example, the sensors of the smart watch may be able to identify that the user is looking in a bag, digging through couch cushions, walking across a room, or the like. Or, the sensors may be able to identify that the user has changed pace since the call has been received (e.g., the user was not moving or was moving slowly, but is now running, walking quickly, moving erratically, etc.). Such actions and/or changes in behavior may imply that the user is attempting to interact or otherwise answer the incoming call. Sensors suitable for collecting such behavior/activity information include, but are not limited to, accelerometers, gyroscopes, magnetometers, pedometers, proximity sensors, as well as light, audio, and/or video sensors. Attempts to interact with the mobile phone may include trying to answer the phone, trying to find the phone, trying to mute the phone, etc.

In some examples, the user may have misplaced their mobile phone or at least have placed it in a location that is not easily accessible or not nearby. Many mobile phones are configured to ring a particular or configured number of times before sending the caller to voicemail. However, if the user's peripheral device is able to identify that the user is attempting to interact with the mobile phone (e.g., they are searching for the phone, walking or running to get to the phone, searching for the phone in a particular location, or the like), the peripheral may provide instructions for the mobile phone to extend the number of rings. In this way, the call may be answered without the caller being sent to the voicemail system. Additionally, in some examples, the instructions may further instruct the mobile phone to send a message (e.g., a simple message service (SMS) message, some other type of text, an email, or the like) to the caller, indicating that the number of rings is being extended and/or that the user is attempting to answer the phone. Thus, the caller may be informed to stay on the line and continue to wait for the user to answer, as opposed to hanging up. In some aspects, the instructions from the user device may instruct the mobile phone to change the number of rings prior to invoking or otherwise sending the caller to the voicemail system via an internal or local setting of the mobile phone. However, in other aspects, the mobile phone may change the number of rings by sending an instruction to the service provider (e.g., the cellular carrier) that is transmitting the call from the caller to the user's mobile phone. In other examples, the user device may be able to determine, independent of user actions, that the mobile phone is too far away for the user to answer (based on user location information identified by the user device and phone location information received by the mobile phone).

In one example, the user may utilize a smartphone (e.g., a mobile phone with computer processing, network interfaces, and one or more software applications) and a smart watch (e.g., an electronic wrist watch or the like with computer processing, network interfaces, and/or one or more software applications). The smartphone and the smart watch may be connected via one or more network connections (e.g., Bluetooth, WiFi, or the like) and may be configured to communicate with one another. In some examples, as similarly described above, the smartphone may be configured to provide information and/or alerts (e.g., information about incoming calls, the location of the smartphone, etc.) to the smartphone. Alerts may include notifications (e.g., indications of information from one or more software applications and/or an operating system), alarm information, application information, battery information, system information, etc.

While examples are given where the peripheral and/or wearable device described herein is a smart watch and where the communication device is a smartphone, any consumer electronic devices may be configured to operate the features described herein. For example, the peripheral device may be a headset, a portable audio or video device, a smart button or belt buckle, or the like. Further, while the intent of the user is described as being identified by the peripheral device, it should be understood that any computing system (including the smartphone) may be used to determine the intent of the user based at least in part on collected behavior/activity information. For example, a remote service provider, external server, local area network device, or the like may be configured to determine the intent and/or likelihood of intent of the user (e.g., using application programming interface (API) method calls or the like).

FIG. 1 illustrates an example environment 100 for describing features of the present disclosure. In the example environment 100, a user 102, utilizing and/or wearing a smart watch 104, may be within a first room 106 of a building (i.e., a home, office, etc.). The building may also have a second room 108, accessible from the first room 106, and the user 102 may also have a smartphone 110 or other communication device. In this specific example, the user 102 has placed their smartphone 110 on a desk or table within the second room 108, and then sat down on a sofa in the first room 106. As such, the smartphone 110 may not be viewable, audible, or otherwise easily accessible by the user 102. For example, the user 102 may have set the smartphone 110 down to charge the battery or the like, and may have gone in the first room 106 to watch television or have a conversation with someone. The smart watch 104 and the smartphone 110 may be in communication with one another via a local network connection, such as, but not limited to, Wi-Fi, Bluetooth, or the like. However, as noted, the user 102 may not be able to see or hear whether the smartphone 110 is ringing from the first room 106.

In one instance, a second user 112 may attempt to place a telephone call to the first user 102. The call 114 may be transmitted from a second communication device 116 of the second user 112 to a service provider 118 configured to route cellular or other types of mobile telephone calls between user devices (e.g., via network interfaces of the user devices). The service provider 118 may be configured with one or more towers for broadcasting incoming calls as appropriate. The service provider 118 may route the call 114 to the smartphone 110 of the first user 102. Upon receipt of the incoming call, the smartphone 110 may begin to ring, vibrate, or otherwise indicate that an incoming call is being received. Additionally, the smartphone 110 may send a signal to the smart watch 104, indicating that a call is incoming. In some cases, the user 102 may have forgotten where they placed the smartphone 110; however, in other cases, the user 102 may just be too far from the smartphone 110 to answer before the call is sent to voicemail. In any event, the user 102 may, upon receipt of the call indication 120, begin looking for the smartphone 110 or at least moving towards the smartphone 110. Because the user 102 is wearing the smart watch 104 (and at least partly because the smart watch 104 is equipped with accelerometers and/or other sensors), the smart watch 104 may be able to detect the movement of the user 102 that occurs after the call indication 120 is received. The smart watch 104 may be able to detect several different behaviors of the user, and may be able to predict or otherwise determine the intent of the user 102 with respect to the smartphone 110.

For example, if the user 102 was sitting in the first room 106, and began walking towards the smartphone 110 just after the call indication 120 was received, the smart watch 104 may be able to infer that the user 102 is attempting to interact (e.g., answer) the smartphone 110. Additionally, if the user 102 began moving their hands around (e.g., erratically or the like), the smart watch 104 may be able to infer that the user was looking for the smartphone 110 and, thus, is also attempting to answer the smartphone 110. Erratic hand movements may suggest that the user 102 was searching within a pocket, a bag, a purse, etc., to find the smartphone 110. If the user 102 was walking before the call indication 120 was received, but then the user 102 began running, the smart watch 104 may also infer that the user is attempting to answer the smartphone 110. Alternatively, if the user 102 was lying down before the call, and no change in activity was detected with respect to their activity/behavior upon receipt of the call indicator 120, the user 102 may be attempting to ignore the incoming call 114. As shown in the example of FIG. 1, after the call indication 120 is received by the smart watch 104, the user 102 gets up from the sofa and begins walking around the first room 106. As such, the smart watch 104 may infer that the user 102 is attempting to answer the phone, and may send an instruction to the smartphone 110 to update a behavior of the smartphone 110. For example, behavior update may include extending the number of rings that the smartphone 110 will provide before activating a voicemail service, providing information to the second user 112 about the call 114, etc. Based at least in part on the configuration of the smartphone 110 and/or the service provider 118, instructions may be provided by the smartphone 110 to the service provider 118 for updating the smartphone 110 behavior (e.g., when the update is to extend the number of rings).

Figure 2:
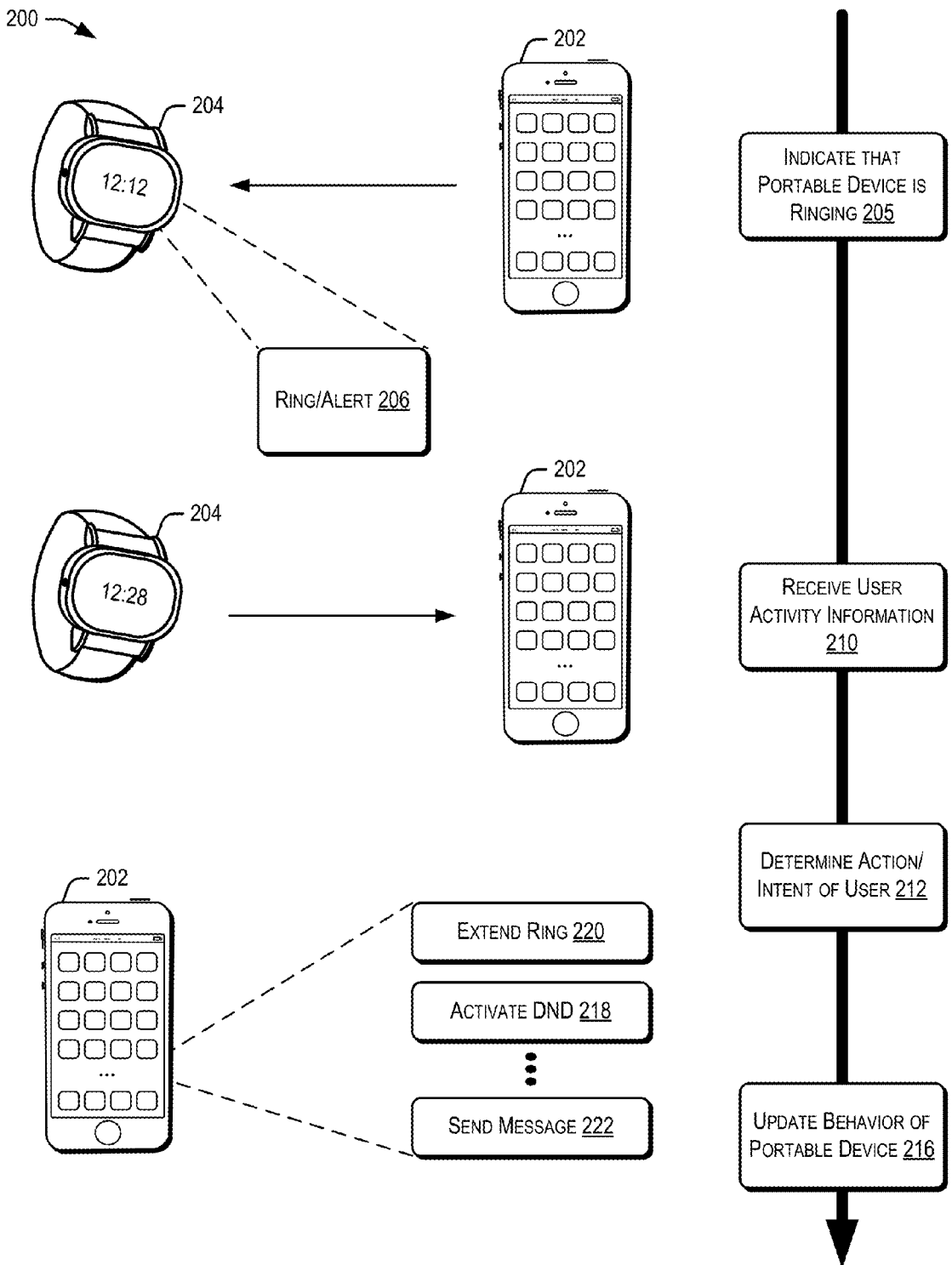
FIG. 2 is a simplified flow diagram illustrating at least some example techniques for updating device behavior based on user behavior as described herein, according to at least one example.

FIG. 2 illustrates a simplified flow diagram 200 depicting examples of updating a user device based at least in part on behavior and/or activity information of a user detected by sensors of a wearable device, as described herein. In some examples, a user may be associated with two different devices as described above. For example, the user may own or otherwise use a mobile phone 202 and a smart watch 204. As noted, the two devices may be in communication via one more wireless connections. The mobile phone 202 may receive a call placed by a caller from a service provider such as a cellular carrier or the like. In some cases, at 205, the mobile phone 202 may provide information to the smart watch 204 that indicates that the phone 202 is ringing. As desired, the mobile phone 202 may also ring with an audio tone and/or vibrate to indicate to the user that an incoming call is being received. However, in other cases, the user may not be able to see or hear that the mobile phone 202 is ringing. In any event, upon receiving the indication of the incoming call, the smart watch 204 may provide a ring and/or alert 206. In this way, even when the user is not close enough to the mobile phone 202 to learn of the incoming call, the smart watch 204 may alert them. In some instances, the user may be able to answer the incoming call via the smart watch 204. However, in other cases, the user may need to accept or otherwise answer the call at the mobile phone 202 (e.g., by physically pressing a button or touch-screen icon of the mobile phone 202).

It may be the case, however, that the user is unable to find the mobile phone 202 or is unable to physically reach the mobile phone 202 in time to answer the incoming call. That is, some smartphones may be configured to only allow a certain number of incoming rings per call before sending the caller to voicemail. While the number of rings may be configurable by the user, it may not be possible to manually update the number of rings while a call is incoming. In other words, if the user cannot reach the phone, they would not likely be able to extend the number of rings prior to answering the call. However, as described herein, the mobile phone 202 may be able to automatically extend the number of rings so that the caller is not sent to voicemail after the previously set or default number of rings. In this way, the user may be able to answer the incoming call without the call being routed to the voicemail system even if the user is unable to reach the mobile phone 202 or otherwise answer the incoming call prior to the preset or default number of rings.

In some examples, the smart watch 204 (when physically worn by the user) may be configured to collect or otherwise detect user activity and/or behavior information. For example, the smart watch 204 may be able to identify whether the user is walking, running, lying down, sleeping, moving (e.g., shuffling) his or her hands in a bag or pocket, or the like. Thus, the smart watch 204 may be able to identify activity and/or behavior of the user both before and after the indication, at 205, of the incoming call. In some examples, the activity information may be received by the mobile phone 202 (e.g., from the smart watch 204) at 210. The mobile phone 202 may then be able to determine a specific action and/or intent of the user at 212. Specific actions may include selecting a button or user interface (UI) element (e.g., an icon, a virtual button, or the like) of the wearable device, moving faster than before the call was identified, moving slower than before the call was identified, walking or running towards the mobile phone 202, moving hands (e.g., quickly, slowly, in a circular motion, or similar) at a location relatively close to the mobile phone 202 (e.g., in a bag, in a pocket, near a sofa, or the like), lying down, sleeping, or the like. As noted, the mobile phone 202 may also be able to determine the intent of the user based at least in part on received activity information. For example, the mobile phone 202 may be able to determine that the user is searching for the mobile phone or attempting to answer the mobile phone 202.

The intent of the user may, in some cases, be inferred by the specific activity or action being performed by the user. For example, if the user was sitting down prior to the call and then begins moving towards the location of the mobile phone 202 after the call is identified, the mobile phone 202 may infer that the user intends to answer the phone. Additionally, if the user is walking in one direction prior to the call, and then changes direction (e.g., in the direction of the mobile phone 202), the mobile phone 202 may also infer that the user intends to answer the phone. Similarly, if the user is quickly moving their hands near the mobile phone 202, the mobile phone 202 may be able to infer that the user is attempting to find the mobile in a bag, pocket, sofa, chair, desk drawer, or the like. Alternatively, or in addition, the user may be lying down prior to the call, and may remain lying down even after the call is identified. In this case, the mobile phone 202 may determine that the user does not intend to answer the mobile phone 202. In some examples, the mobile phone 202 may update a behavior of the phone 202 based at least in part on the determined intent at 216. For example, when the mobile phone 202 determines that the user does not intend to answer the phone, the mobile phone 202 may be placed in a "do not disturb" mode 218. However, in other use cases, where the mobile phone 202 determines that the user intends to answer the call, the mobile phone 202 may extend the number of rings 220 before the caller is sent to voicemail and/or send a message to the caller 222 (e.g., the message may instruct the caller to "call back later," "continue waiting," etc. In other examples, when it is determined that the user intends to answer the phone, the mobile phone 202 may be instructed to increase its ring volume, the smart watch 204 may provide a map (e.g., with directions to the mobile phone 202), the mobile phone 202 may send the call to the smart watch 204 (e.g., to be answered there), or the like.

Figure 3:
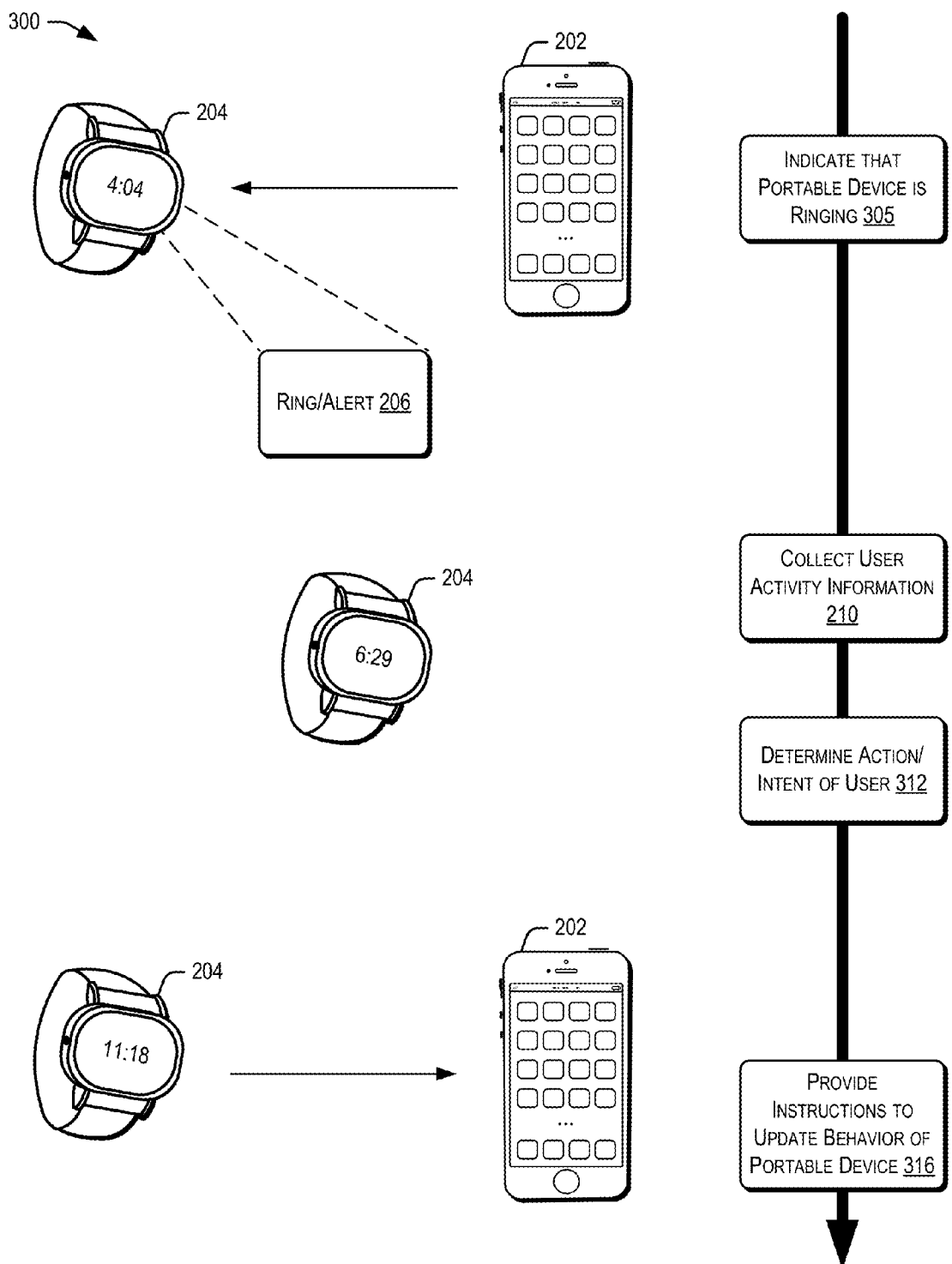
FIG. 3 is another simplified flow diagram illustrating at least some additional example techniques for updating device behavior based on user behavior as described herein, according to at least one example.

FIG. 3 illustrates another simplified flow diagram 300 depicting other examples of updating a user device based at least in part on behavior and/or activity information of a user, as described herein. In FIG. 3, the same user devices as in FIG. 2 are shown. For example, a user may utilize a mobile phone 202 and a smart watch 204. And, much like as shown in FIG. 2, the mobile phone 202 may indicate to the smart watch 204 that the phone is ringing (e.g., signaling that an incoming call is being received), here at 305. Similarly, at 310, the smart watch 204 may collect user activity information before and/or after receipt of the indication at 305. However, in this example, the action and/or intent of the user may be determined by the smart watch 204, at 312, instead of the mobile phone 202 as shown in FIG. 2. In some examples, the smart watch 204 may already be configured to detect user activity (e.g., for use with other applications and functions of the smart watch 204). In this example, the smart watch 204 may then provide instructions to update the behavior of the mobile phone 202 at 316. In this way, the mobile phone may not need to be configured with any particular software or functionality for implementing the features described herein. Instead, the smart watch 204 may be able to handle most of the logic and may manage (e.g., stored locally) a mapping between determined actions and/or intents of the user with appropriate instructions for updating the behavior of the mobile phone 202 (e.g., extending the ring, sending a message to the caller, increasing the volume, etc.). Thus, the mobile phone 202 may almost act a thin client, receiving relevant instructions from the smart watch 204.

Figure 4:
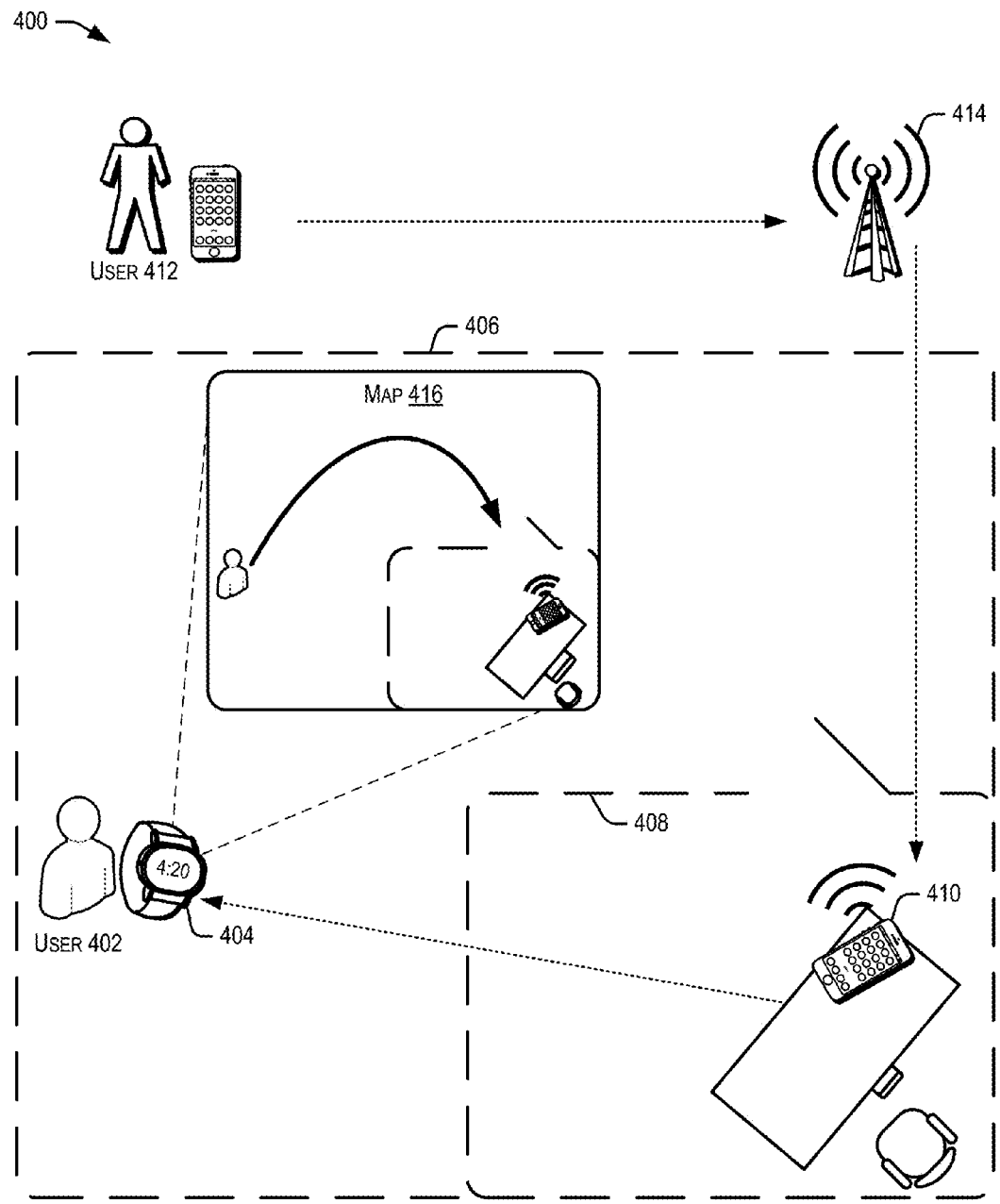
FIG. 4 is another simplified block diagram illustrating at least some additional example techniques for updating device behavior based on user behavior as described herein, according to at least one example.

FIG. 4 illustrates another example environment 400 for describing features of the present disclosure. Similar to in FIG. 1, in the example environment 400, a user 402, wearing a smart watch 404, may be within a first room 406. Adjacent, within, or otherwise near the first room 406, there may also be a second room 408, accessible by the user 402. Additionally, the user 402 may also have a smartphone 410 or other communication device. In this specific example, the user 402 may have placed their smartphone 410 on a desk or table within the second room 408; yet, the user 402 may be located in the first room 406. As such, the smartphone 410 may not be viewable, audible, or otherwise easily accessible by the user 402. For example, the user 402 may have set the smartphone 410 down to charge the battery or the like, and may have gone in the first room 406. The smart watch 404 and the smartphone 410 may be in communication with one another via a local network connection, such as, but not limited to, Wi-Fi, Bluetooth, or the like. However, as noted above, the user 402 may not be able to hear if the smartphone 410 is ringing from the first room 406.

Much like in FIG. 1, a call may be placed by a second user, here user 412, via a service provider or cellular carrier 414. And, when the mobile phone 410 receives the incoming call, the mobile phone 410 may provide information to the smart watch 404, indicating that the incoming call is being received at the mobile phone (i.e., the mobile phone 410 is ringing). As noted, in some examples, the smart watch 404 may be configured to collect activity and/or other biometric information from the user 402. And, this information may be utilized by the smart watch 404 and/or the smartphone 410 for determining the intent of the user 402 with respect to the smart phone 410 and/or the call itself. Based at least in part on the determined intent, the smart watch 404 may be configured to provide instructions for updating the behavior of the mobile phone 410 (e.g., extending the ring, increasing the ring volume, or the like) and/or the mobile phone 410 may be configured with instructions for updating its own behavior.

Further, in some examples, the smart watch 404 may be configured to provide a map 416 as part of a user interface (UI) of the smart watch 404 display. For example, while the ring is being extended, or instead of extending the ring, the map 416 may provide an illustration of the location of the mobile phone 410. In this way, the user 412 may be aided in attempting to find the mobile phone 410, especially when it is determined that the user intends to answer the call. In some examples, the map 416 may illustrate the location of the mobile phone 410 with respect to the user's 402 current location (e.g., a simple map that shows the user 402 in one room and the phone in the other room). However, in other examples, the map 416 may include turn-by-turn or step-by-step directions. As the user 402 moves towards the mobile phone 410, the map may be dynamically updated to show each of the user's 402 current locations. In addition, distance and/or time metrics may be displayed as part of the map, indicating to the user 402 how much longer is it expected to take them to reach the mobile phone 410. The updated behavior of the mobile phone 410 may, in some cases, be based at least in part on the distance and/or time metrics (e.g., by extending the number of rings appropriately). As such, if it estimated to take the user 402 thirty seconds to reach the mobile phone 410, the number of rings may be extended to allow for at least thirty more seconds worth of rings. The location of the mobile phone 410 with respect to the user 402 may be identified and/or determined by the mobile phone 410 and/or the service provider 414, and may be provided to the smart watch 404 by the mobile phone 410.

Figure 5:
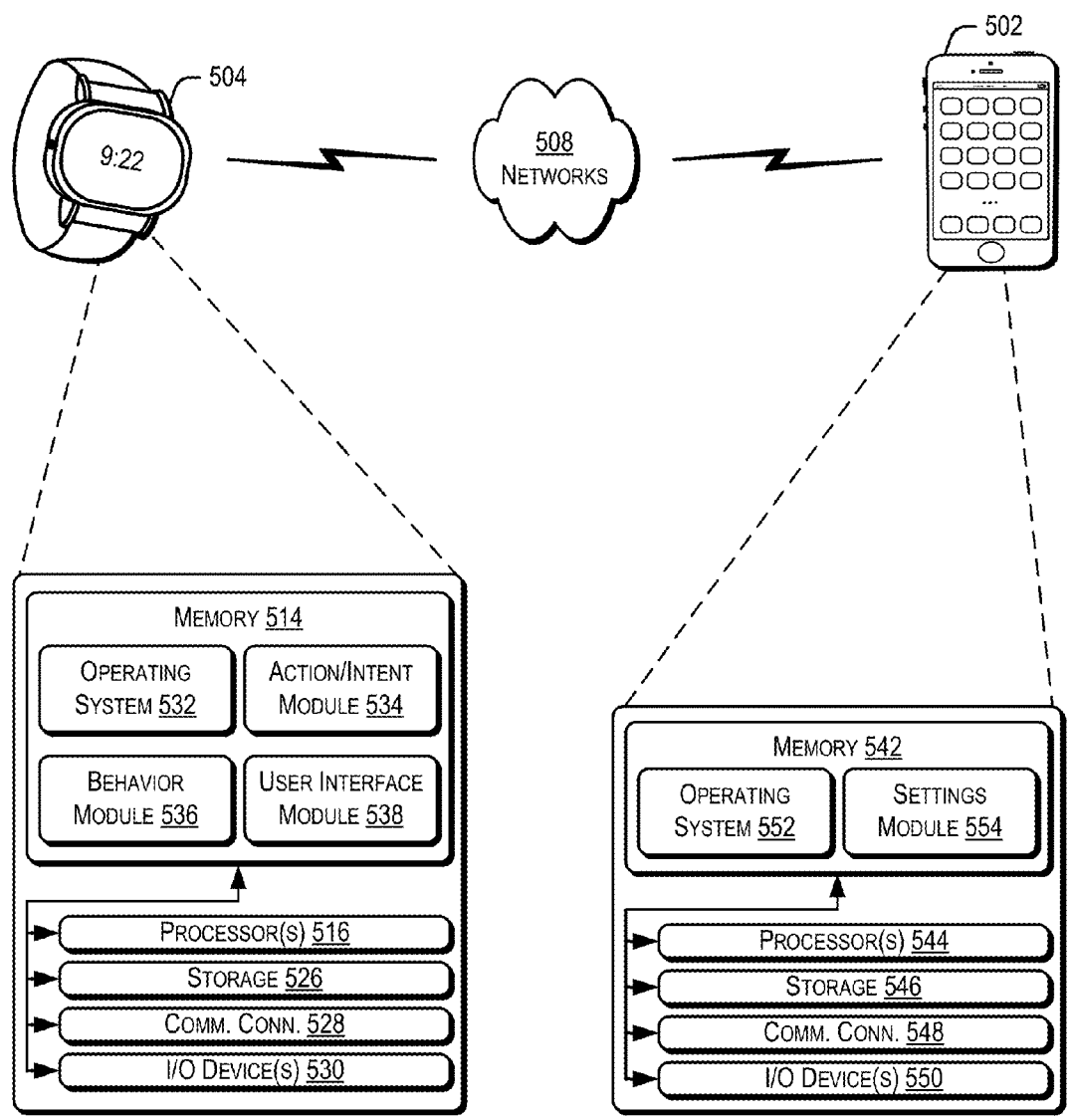
FIG. 5 is another simplified architecture diagram illustrating at least some example techniques for updating device behavior based on user behavior as described herein, according to at least one example.

FIG. 5 illustrates an example architecture or environment 500 configured to update behaviors and/or settings of a user device 502 (e.g., a mobile phone) based on the activity inferred by another user device 504 (e.g., a wearable), according to at least one example. In some examples, the example architecture 500 may further be configured to manage or otherwise interact with one or more service providers and/or service provider computers or other computing devices of FIG. 1 (e.g., a cellular provider and/or a web service provider). In some examples, the devices may be connected via one or more networks 508 (e.g., via Bluetooth, WiFi, the Internet, or the like). In the architecture 500, one or more users may utilize the user device 502 to manage, control, or otherwise utilize the wearable device 504, via the one or more networks 508.

In some examples, the networks 508 may include any one or a combination of many different types of networks, such as cable networks, the Internet, wireless networks, cellular networks, satellite networks, other private and/or public networks, or any combination thereof. While the illustrated example represents the user device 502 accessing the wearable device 504 via the networks 508, the described techniques may equally apply in instances where the user device 502 interacts with the wearable device 504 over a landline phone, via a kiosk, or in any other manner. It is also noted that the described techniques may apply in other client/server arrangements (e.g., set-top boxes, etc.), as well as in non-client/server arrangements (e.g., locally stored applications, peer to peer configurations, etc.).

As noted above, the wearable device 504 may be configured to execute or otherwise manage applications or instructions for operating one or more biometric sensors, motion detection sensors, or other sensor devices configured to identify user activity. The wearable device 504 may have a "do not disturb" mode or a silence/vibrate mode, either of which may be set by a user via an external button and/or a UI element of the wearable device 504. The "do not disturb" mode may instruct the wearable device 504 not to interrupt or notify the user of any information, except in certain circumstances. The silence/vibrate mode, on the other hand, may instruct the wearable device 504 to remain silent and/or to vibrate when an alert or other information is received from the user device 502 and/or is configured for presentation to the user. As noted, in some examples, an incoming call me be detected or otherwise received by the user device 502 while in an active mode (e.g., not in the "do not disturb" mode). In some examples, when the wearable device 504 is also in an active mode, the user device 502 may provide information to the wearable device 504 that identifies the incoming call. The wearable device 504 may then determine the intent of the user with respect to the incoming call (e.g., is the user attempting to interact with the call, or ignore it) based on activity information detected by the wearable device 504. Based on the inferred intent of the user, the wearable device 504 may provide instructions to the user device 502 to update a setting or behavior of the user device 502.

The user device 502 and/or the wearable device 504 may be any type of computing device such as, but not limited to, a mobile phone, a smartphone, a personal digital assistant (PDA), a laptop computer, a desktop computer, a thin-client device, a tablet computer, a smart watch, a wireless headset, or the like. As noted, the user device 502 may be in communication with the wearable device 504 via the networks 508, or via other network connections.

In one illustrative configuration, the wearable device 504 may include at least one memory 514 and one or more processing units (or processor(s)) 516. The processor(s) 516 may be implemented as appropriate in hardware, computer-executable instructions, firmware, or combinations thereof. Computer-executable instruction or firmware implementations of the processor(s) 516 may include computer-executable or machine-executable instructions written in any suitable programming language to perform the various functions described. The wearable device 504 may also include accelerometer devices and/or motion detection device for detecting a user's activity or motion while wearing the wearable device 504 or while the user is within view of the wearable device 504. The wearable device 504 may also include geo-location devices (e.g., a global positioning system (GPS) device or the like) for detecting, providing, and/or recording geographic location information associated with the wearable device 504 and/or the user.

The memory 514 may store program instructions that are loadable and executable on the processor(s) 516, as well as data generated during the execution of these programs. Depending on the configuration and type of the wearable device 504, the memory 514 may be volatile (such as random access memory (RAM)) and/or non-volatile (such as read-only memory (ROM), flash memory, etc.). The wearable device 504 may also include additional removable storage and/or non-removable storage 526 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 514 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 514 and the additional storage 526, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. The memory 514 and the additional storage 526 are both examples of non-transitory computer storage media. Additional types of computer storage media that may be present in the wearable device 504 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the wearable device 504. Combinations of any of the above should also be included within the scope of non-transitory computer-readable storage media.

Alternatively, computer-readable communication media may include computer-readable instructions, program modules, or other data transmitted within a data signal, such as a carrier wave, or other transmission. However, as used herein, computer-readable storage media does not include computer-readable communication media.

The wearable device 504 may also contain communications connection(s) 528 that allow the wearable device 504 to communicate with a data store, another computing device (e.g., the user device 502) or server, user terminals and/or other devices via the networks 508. The wearable device 504 may also include I/O device(s) 530, such as a keyboard, a mouse, a pen, a voice input device, a touch input device, a display, speakers, a printer, etc. For example, utilizing a speaker and microphone, the wearable device 504 may be configured to answer the incoming call that is being received by the user device 502. To implement this, the user device 502 may pass the call to the wearable device 504 via the networks 508.

Turning to the contents of the memory 514 in more detail, the memory 514 may include an operating system 532 and/or one or more application programs or services for implementing the features disclosed herein including an action/intent module 534, a behavior module 536, and/or a user interface module 538. In some examples, the action/intent module 434 may be configured to detect user actions and infer or otherwise determine the user's intent based on those actions. For example, and as discussed above, one or more sensors of the wearable device 504 may be able to detect user actions with respect to the user device 502 before and/or after a call is received at the user device 502. In this way, the action/intent module 534 can determine whether the user is attempting to interact with the user device 502 (e.g., answer the call), attempting to ignore the user device 502 (e.g., the user is sleeping), attempting to find the user device 502, or attempting to perform other appropriate actions associated with the user device 502.

Additionally, the action/intent module 534 may be configured to identify user gestures that can be used to determine or otherwise recognize the intent of the user without having to infer. For example, physical gestures performed by the user while wearing the wearable device 504 (e.g., shaking of the wrist, waving, first pumping, etc.) may be programmed (and/or customized) to be associated with particular behavior updates of the user device 502. For example, there may be gestures associated with answering the call, ignoring the call, extending the call, etc. Further, the gesture may include spoken words that can be detected by the wearable device 504. Once the gesture is detected, the wearable device 504 may provide instructions to the user device 502 for updating a setting or action of the user device 502. For example, a call may be received at the user device 502, and the user device 502 may provide an alert to the wearable device 504. The wearable device 504 may then listen for or otherwise receive a gesture (shaking of wrist, etc.). If the received gesture is associated with an action of the user device 502, the wearable device 504 may provide instructions to the user device 502 for performing that action (e.g., extending the number of rings, etc.). In other examples, or while listening for a gesture, the wearable device 504 may be configured to provide a UI element for determining the intent of the user. In this way, the wearable device 504 may be able to identify the intent of the user without first inferring it from user activity. A physical and/or fixed activator or button, or microphone (e.g., with voice recognition capabilities) on the wearable device 504 might be used instead of a UI element. Or, the UI element described throughout (e.g., with association to various features and/or implementations of the current disclosure) may be configured to receive a user input (e.g., free form text or the like), and determine the intent from the user input based on text provided by the user (e.g., the user might type "extend the rings," or "extend the rings (x) times," or "(x) seconds" where "x" is the number of rings or seconds, respectively, the user wishes to extend). For example, after the wearable device 504 receives an indication of an incoming call (e.g., received by the user device 502), the wearable device may render or otherwise provide a UI element to the user that asks the user how they would like to interact with the incoming call (e.g., answer the call at the wearable device 504, answer the call at the user device 502, extend the rings, ignore the call, send a message to the caller, etc.). As noted, the user may select an option, enter free-form text, or provide a voice or gesture command.

In some examples, the action/intent module 534 may also be configured to receive or otherwise manage location information associated with either or both of the wearable device 504 or the user device 502. Location information of the user device 502 may be detected by the wearable device 504 (via sensors of the wearable device, network information, etc.) or received from the user device 502. Using this location information, the action/intent module 534 may be able to detect that the user and/or wearable device 504 is too far from the user device 502 to answer the incoming call (e.g., given that the number of rings and/or amount of time the user device 502 will ring is known or preset). In this example, the wearable device 504 may automatically provide instructions to the user device 502 for updating its behavior (i.e., the behavior of user device 502). For example, when the devices are too far from each other (but, still close enough to communicate), the updated behavior may include, extending the rings, sending a message to the caller or calling device to wait for the user to answer, sending a message to the caller or calling device to call back at a later time, or the like. In some examples where the two devices are too far for the user to answer the call, if the user device 502 is in a "do not disturb" mode, but the wearable device 504 is not, the wearable device 504 might indicate that the user device 502 is ringing, even though the user device 502 is not actually (e.g., audibly) ringing. Alternatively, if both the wearable device 504 and the user device 502 are in a "do not disturb" mode, both devices may ignore the incoming call, or the user device 502 might not ring, but the wearable device 504 might notify the user of the call and/or ask the user (e.g., via a UI element) what they want to do.

The action/intent module 534 may also be configured to determine when a user is resting, sleeping, or otherwise not taking calls based on a level of activity of the user. For example, the action/intent module 534 may be able to identify that a user is lying down, has not moved for some time, and/or that the time of day matches a time when the user usually rests. In this scenario, the action/intent module 534 may infer that the user is sleeping, and may provide instructions to the user device 502 to update the behavior or setting of the user device 502 as described above. In some examples, the updated behavior may include preparing an electronic message (e.g., a text, an email, or the like) to the caller, placing the user device 502 in "do not disturb" mode, and/or silencing the ring (e.g., so that the user cannot hear the ringing, even though the caller may). For example, the user device 502 may provide any of the following, or similar, messages: "I'm sleeping, please call me back later," "I'm sleeping and will likely take me a few moments to figure out where my phone is," "I'm sleeping, please hold on," "I'm sleeping, is this an emergency?," or "I'm sleeping, do you want to wake me up?" Further, in some cases, the user device 502 may not ring and/or the wearable device 504 may not alert the user of the call while the user is resting. However, in some cases, the user device 502 may begin ringing if the caller responds to the message, indicating that it is an emergency or that the caller would like to wake up the user (i.e., the user indicates the relative importance of the call). In at least one additional example, the user device 502 may receive a call, but remain silent based at least in part on the example above (i.e., that the wearable device 504 detected that the user was resting). While a message is sent to the caller asking whether they would like to wake up the user (or at least attempt to wake up the user), the number of rings may be automatically extended (in this and other examples, the rings may be silent to the user, yet the caller may hear them). If the caller stays on the line beyond a threshold (e.g., double the normal number of rings, etc.), the user device 502 may provide this information (e.g., that the user has remained on the line) to the wearable device 504, and the wearable device 504 may infer that the caller would like to attempt to wake up the user. Based on this inference, the wearable device 504 may instruct the user device 502 to being ringing in such a way that the user will hear/feel it (e.g., by raising the volume, turning on the volume, taking the user device 502 out of "do not disturb" mode, increasing the level of haptic feedback, or the like).

The behavior module 536, in some cases, may be configured to identify or otherwise determine an appropriate behavior of the user device 502 based at least in part on the determined intent or identified action of the user. The appropriate behaviors may be stored in a table (e.g., within the memory 514 and/or storage 526), with each behavior associated with one or more set of intents or actions identified by the action/intent module 534. The behavior module 536 may be also be responsible for providing instructions to the user device 502 for updating the behavior and/or a setting of the user device 502. For example, the actions, intents, and associated behaviors may be stored in a lookup table or other data structure. When an action or intent of the user is inferred or otherwise determined by the action/intent module 534, the behavior module 536 may receive the inferred intent and look up the associated behavior.

Behaviors of the user device 502 may include, but are not limited to, extending the ring (e.g., the number of rings or amount of time ringing), making the audio of the ring louder, changing the ring to a longer audio track, song, or ringtone, sending a map to the wearable device 504, increasing or extending a vibration (e.g., the user device 502 is in a "silent" mode), sending a ping to the wearable device 504, and/or turning the volume on or up (e.g., if the user device 502 is in "silent" or "do not disturb" mode). For the last example, the updated behavior may include overriding a physical switch or other user setting. For example, if the ringtone of the user device 502 is set to "off" or "vibrate" (e.g., "silent" mode), the updated behavior may be to override this setting to turn the audio on so that the user device 502 makes a noise as it rings. Further, as desired, any of the above settings may be programmed, configured, or otherwise set by the user via an explicit option or settings configuration UI of the user device 502 and/or the wearable device 504.

The behavior module 536 may also be configured to manage the number of rings that the user device 502 will provide before initiating a voice messaging service or the like. For example, the number of rings may be set to infinite (such that the user will always be able to answer the phone), the user may be able to configure the number of rings, and/or there may be a threshold number of rings different scenarios (e.g., based at least in part on the time of day, the inferred activity and/or intent of the user, the location of the wearable device 504 with respect to the user device 502, etc.). Additionally, in some examples, a preset or default number of rings may be standard, and when the behavior module 536 determines to extend the rings, the number of rings or an amount of time for the user device 502 to ring may be extended by a number (e.g., double or triple the default number of rings) or a percentage (e.g., increase the number of rings or amount of time ringing by 10%, 50%, etc.). Further, in some examples, the number of rings to extend or the amount of time to extend the ring may be dynamically determined and/or based at least in part on the amount of time that the wearable device 504 expects it will take the user to get to the user device 502 (e.g., based on the speed, distance, or other factors associated with the activity of the user).

The user interface module 538 may be configured to manage the user interface of the wearable device 504. For example, the user interface module 538 may provide, for display, one or more options for updating the behavior of the user device 502; for example, for responding to an incoming call (e.g., "extend the rings of the call x times") without first detecting the intent of the user. Additionally, in some examples, the user interface module 538 may be configured to receive and/or interpret user gesture information (e.g., via touch screen) for updating the behavior of the user device 502. For example, a user may swipe an alert of the wearable device 504 that indicates that the call is being received at the user device 502. The swipe gesture may indicate that the user intends to answer the call; thus, the wearable device 504 may instruct the user device 502 to extend the number of rings before invoking the voicemail system. As desired, the user interface module 538 may also be utilized to provide alerts and/or other notifications regarding the user device 502 (e.g., current settings) and/or the incoming call (e.g., the number of rings, the distance of the user device 502 from the wearable device 504, etc.).

The user device 502 may also be any type of computing device. In one illustrative configuration, the user device 502 may include at least one memory 542 and one or more processing units (or processor(s)) 544. The processor(s) 544 may be implemented as appropriate in hardware, computer-executable instructions, firmware, or combinations thereof. Computer-executable instruction or firmware implementations of the processor(s) 544 may include computer-executable or machine-executable instructions written in any suitable programming language to perform the various functions described.

The memory 542 may store program instructions that are loadable and executable on the processor(s) 544, as well as data generated during the execution of these programs. Depending on the configuration and type of the user device 502, the memory 542 may be volatile (such as RAM) and/or non-volatile (such as ROM, flash memory, etc.). The user device 502 may also include additional removable storage and/or non-removable storage 546 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 542 may include multiple different types of memory, such as SRAM, DRAM, or ROM. While the volatile memory described herein may be referred to as RAM, any volatile memory that would not maintain data stored therein once unplugged from a host and/or power would be appropriate. The memory 542 and the additional storage 546, both removable and non-removable, are both additional examples of non-transitory computer-readable storage media.

While many of the examples herein are described with reference to the wearable device 504 being a smart watch, it should be understood that any type of computing device may be used to perform the functions/embodiments described, as appropriate. For example, the wearable device 504 may be a wireless headset or earpiece, or other computing device that can collect user activity information (e.g., including an accelerometer or other motion detection device). Where the wearable device 504 is a wireless headset or earpiece, the wearable device 504 may also be equipped a microphone and speaker(s). As such, the wearable device 504 (as described above) may be configured for answering the incoming call on behalf of the user device 502. Additionally, in some examples, the wearable device 504 may be configured to identify the call being received by the user device 502, identify an intent of the user to interact with the call using a headset (e.g., a third device on the network 508), and provide instructions to the user device 502 to extend the number of rings or ring time at the user device 502 until the user is able to reach or other activate the headset. Each feature and/or embodiment described herein should be understood to cover the scenario where the user intends to answer the incoming call at a third device (e.g., the headset or earpiece), where the incoming call is hosted or otherwise initially received at the user device 502. In other words, the activity of the user may be used to identify intent regarding interacting with the call (e.g., answering it) regardless of which device they intend to interact with.

The user device 502 may also contain communications connection(s) 548 that allow the user device 502 to communicate with a data store, another computing device or server, user terminals and/or other devices via the networks 508. The user device 502 may also include I/O device(s) 550, such as a keyboard, a mouse, a pen, a voice input device, a touch input device, a display, speakers, a printer, etc.

Turning to the contents of the memory 542 in more detail, the memory 542 may include an operating system 552 and/or one or more application programs or services for implementing the features disclosed herein including a settings module 554. In some examples, the settings module 554 may be configured to manage and/or update the configuration of device settings (e.g., updating the behavior of the user device 502). For example, the user device 502 may be configured to receive incoming calls for the user, and the settings (which may be manually configured by the user) may provide instructions to the user device 502 regarding how to handle particular situations/scenarios. When the user device 502 is in an active mode (e.g., configured to receive calls and ring or otherwise indicate that the call is incoming), the settings module 554 may indicate that the user device 502 should ring. Ringing may include providing any audio tone (a ring, a ringtone, a song, an alert), providing haptic feedback (e.g., vibrating), and/or providing a visual indicator (e.g., the screen may light up or the number of the caller may be displayed). In some cases, while in an active mode, the user device 502 may set on "silent," in which case the settings module 554 may be configured to indicate that only visual or haptic feedback should be provided when an incoming call is received. Additionally, in some examples, the settings module 554 may be configured to provide instructions to a service provider (e.g., a web service or a cellular service) for extending the number of rings for the incoming call. As such, when the behavior module 536 of the wearable device 504 provides behavior information and/or settings information, the settings module 554 of the user device 502 may receive and process those instructions.

In some cases, a service provider (e.g., a web service or the like) or other entity (e.g., a company or the like that provides and/or manages the user device 502) may manage the number of rings of each incoming call. The service provider or the other entity may also be configured with a voice messaging service or may be configured to utilize a third-party messaging service. In these examples, the service provider, the other entity, or the user of the user device 502 may set the initial or default number of rings (or amount of time) before the incoming call is routed to the voice messaging service. In this case, when the instructions from the behavior module 536 are received at the user device 502 and the settings module 554 determines to extend the call, the service provider or other entity may extend the number of rings or ring time. The number of rings or ring time may be extended by doubling, tripling, etc., by determining an approximate amount of time until the user answers and extending it that amount, or by extending it infinitely until the user answers the call. The settings module 554 may provide instructions the service provider or other entity, which may in some cases provide instructions to the third-party voice messaging service and/or to the cellular service provider. Alternatively, when a cellular service provider manages the number of rings or the ring time, the settings module 554 of the user device 502 may provide instructions to the cellular service provider when the rings are to be extended and for how long/many.

Figure 6:
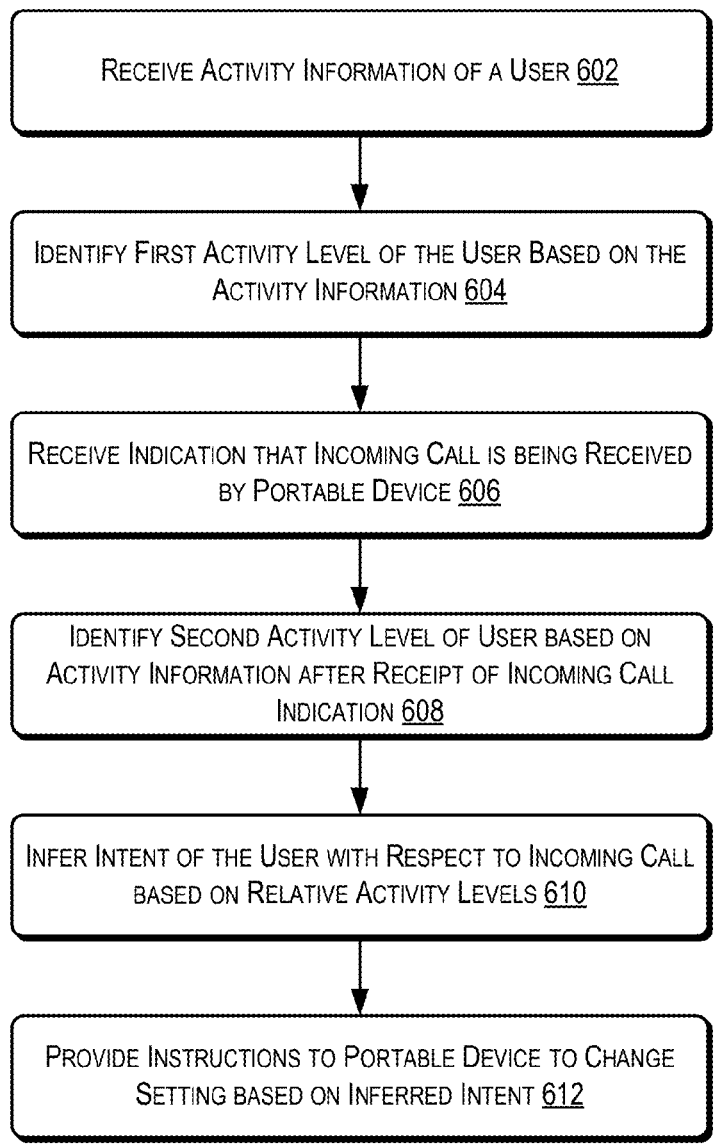
FIG. 6 is another simplified flow diagram illustrating an example process for updating device behavior based on user behavior as described herein, according to at least one example.
Figure 7:
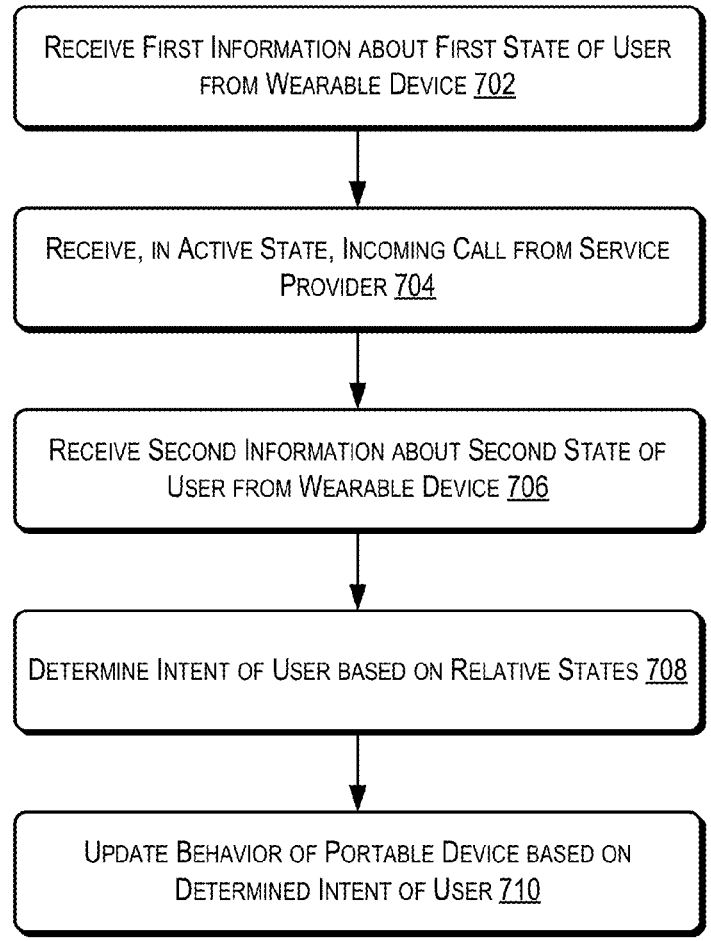
FIG. 7 is another simplified flow diagram illustrating another example process for updating device behavior based on user behavior as described herein, according to at least one example.
Figure 8:
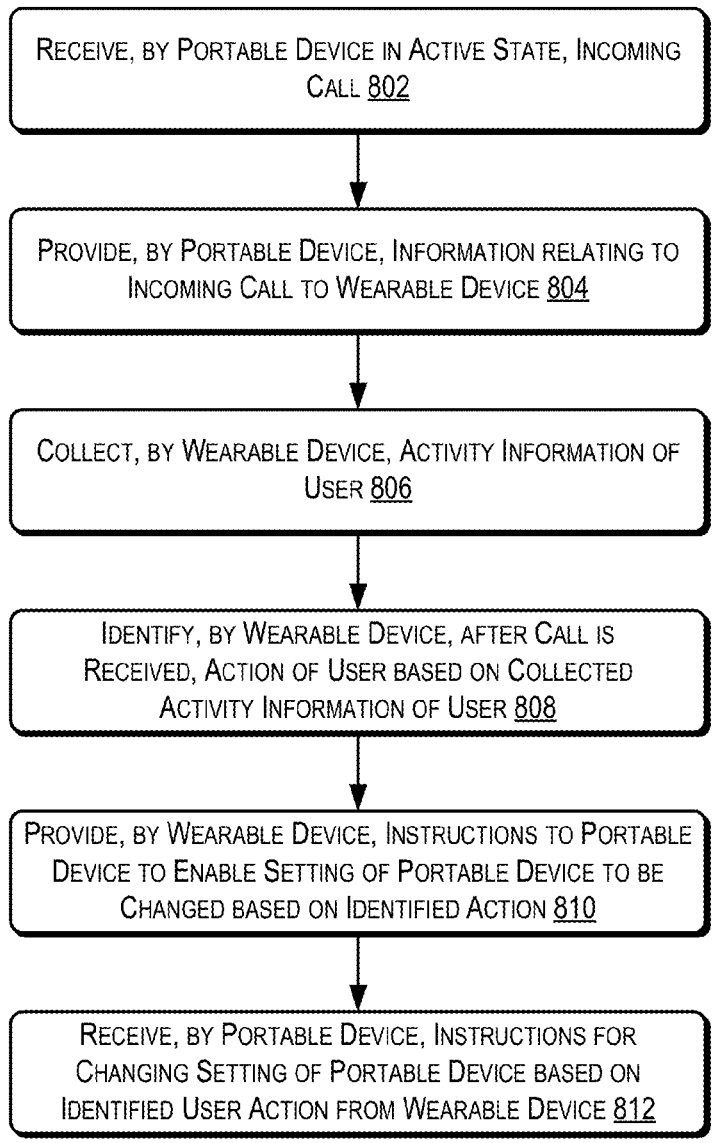
FIG. 8 is another simplified flow diagram illustrating another example process for updating device behavior based on user behavior as described herein, according to at least one example.

FIGS. 6-8 illustrate example flow diagrams showing processes 600, 700, and 800 for updating user device behavior, according to at least a few embodiments. In some examples, the wearable device 504 of FIG. 5 (e.g., utilizing at least the action/intent module 534 and/or the behavior module 536 shown in FIG. 5) may perform the process 600 of FIG. 6. The process 600 may begin at 602 where the wearable device 504 may receive activity information of a user. For example, using an accelerometer or other motion detection device, the wearable device 504 may collect and/or store the user activity information. At 604, the wearable device 504 may identify a first activity level of the user based at least in part on the activity level. For example, at any given time, the user may be sitting, standing, walking, running, lying down, etc. Any of these activities may be identified as the first activity level. At 606, the wearable device 504 may receive an indication that an incoming call is being received by a portable device (e.g., the user device 502 of FIG. 5). The indication may be received at 606 from the user device 502 or other portable device associated with the user of the wearable device 504.

In some examples, the wearable device 504 may be configured to identify a second activity level of the user at 608. The second activity level may be based at least in part on additional activity information collected after the indication of the incoming call was received. In this way, any different level of activity of the user detected after the incoming call is received may be used by the wearable device 504 to identify the second activity level. At 610, the wearable device 504 may infer the intent of the user with respect to the incoming call and/or the user device 502 based at least in part on the relative activity levels. That is, the relative difference between the first activity level and the second activity level (or, the differences between what the user was doing before the incoming call was identified versus after the incoming call was identified) may indicate the user's intent. For example, and as described above, if the user was sitting down before the indication of the incoming call, but then walked after the indication, the wearable device 504 may be able to infer that the user's intent is to interact with the incoming call and/or the user device 502 (e.g., to answer the call). At 612, the wearable device 504 may provide instructions to the portable device (e.g., the user device 502) to change a setting of the portable device based at least in part on the inferred intent. For example, the instructions may instruct the portable device to extend the number of rings of the incoming call in order to allow the user enough time to interact with (e.g., to find or otherwise arrive at) the portable device.

FIG. 7 illustrates another process 700 for updating user device behavior, according to at least a few embodiments. In some examples, the user device 502 of FIG. 5 (e.g., utilizing at least the settings module 554 shown in FIG. 5) may perform the process 700 of FIG. 7. The process 700 may begin at 702 where the user device 502 may receive first information about a first state of the user from the wearable device 504. The first state may indicate an activity and/or activity level of the user prior to the user device 502 receiving an incoming call. The first information may be detected and/or collected at the wearable device 504 by one or more accelerometers and/or other motion detection/sensing devices/sensors. At 704, the user device 502 may receive an incoming call from a service provider (e.g., a cellular carrier or the like). The user device 502 may be in an "active" state, meaning that it set (e.g., by the user) to receive incoming calls, as opposed to being in a "do not disturb" mode where incoming calls may be ignored (at least with respect to notifying the user). At 706, the user device 502 may receive second information about a second state of the user. The second information may also be detected, collected, and/or received form the wearable device 504. In some examples, the second state of the user may correspond to a time period after an indication of the incoming call has been provided, by the user device 502, to the wearable device 504. In other words, the second state may be associated with a time when the user is aware that the user device 502 is receiving an incoming call.

At 708, the user device 502 may determine an intent of the user based at least in part on the relative states. Similar to 610 above, the relative states may indicate what has changed regarding the activity of the user from before the indication of the incoming call to after the indication of the incoming. Thus, the user device 502 may be able to use this information to determine or otherwise infer the intent of the user with respect to the incoming call and/or the user device 502. In this way, process 700 is an example where the user device 502 determines the intent of the user based at least in part on the activity information of the user, where process 600 is an example where the wearable device 504 determines the intent of the user based at least in part on the activity information of the user. Further, at 710, the user device 502 may update its own behavior based at least in part on determined intent of the user. For example, the user device 502 may update its own settings or otherwise perform an action that is different from an action normally being performed (e.g., ringing the default number of times) and/or is an update from an action that was being performed at an earlier point in time (e.g., raising the ring volume, sending a message to the caller, extending the number of rings, etc.).

FIG. 8 illustrates another process 800 for updating user device behavior, according to at least a few embodiments. In some examples, the user device 502 and the wearable device 504 of FIG. 5 (e.g., utilizing at least the settings module 554, as well as the action/intent module 534 and/or the behavior module 536, respectively, shown in FIG. 5) may perform the process 800 of FIG. 8. The process 800 may begin at 802 where user device 502 may receive an incoming call from a service provider (e.g., a cellular carrier or the like). The user device 502 may, in some cases, be in an active mode such that it can receive calls and/or provide alerts (e.g., a ring, ringtone, haptic feedback, etc.) to the user. At 804, the user device 502 may provide information relating to the incoming call to a wearable device 504. The information may include an indication that the call is being received, information about the caller, information about the time of the call, and/or information about the location of the user device 502. At 806, the wearable device 504 may collect activity information of the user. At 808, the wearable device 504 may identify an action of the user based at least in part on the collected activity information. In some examples, the action may be identified after the incoming call is received by the user device 502. At 810, the wearable device 504 may provide instructions to the user device 502 to enable a setting of the user device 502 to be changed based at least in part on the identified action. For example, the number of rings may be extended (e.g., the setting is changed) based at least in part on the user attempting to interact with the user device 502 (e.g., the activity may include walking, running, searching in a bag, etc., for the user device 502). At 812, the user device 502 may receive the instructions changing the setting of the user device 502 based at least in part on the identified user action of the wearable device 504. The instructions may include further instructions for providing information (e.g., additional instructions) to the service provider for extending the number of rings or ring time.

Figure 9:
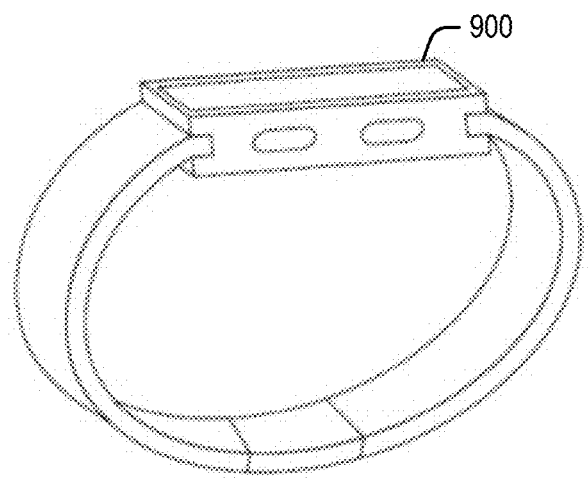
FIG. 9 is a simplified block diagram illustrating an example device for updating device behavior based on user behavior as described herein, according to at least one example.

Embodiments described herein may take the form of, be incorporated in, or operate with a suitable electronic device. One example of such a device is shown in FIG. 9 and takes the form of a wearable mechanism (e.g., the wearable device 504 of FIG. 5 or another type of smart device). As shown, the mechanism may be worn on a user's wrist and secured thereto by a band. The mechanism may have a variety of functions including, but not limited to: keeping time; monitoring a user's physiological signals and providing health-related information based on those signals; communicating (in a wired or wireless fashion) with other electronic devices, which may be different types of devices having different functionalities; providing alerts to a user, which may include audio, haptic, visual and/or other sensory output, any or all of which may be synchronized with one another; visually depicting data on a display; gather data form one or more sensors that may be used to initiate, control, or modify operations of the device; determine a location of a touch on a surface of the device and/or an amount of force exerted on the device, and use either or both as input; accepting voice input to control one or more functions; accepting tactile input to control one or more functions; and so on.

Alternative embodiments of suitable electronic devices include a mobile phone, a tablet computing device, a portable media player, and so on. Still other suitable electronic devices may include laptop/notebook computers, personal digital assistants, touch screens, input-sensitive pads or surfaces, and so on.

Figure 10:
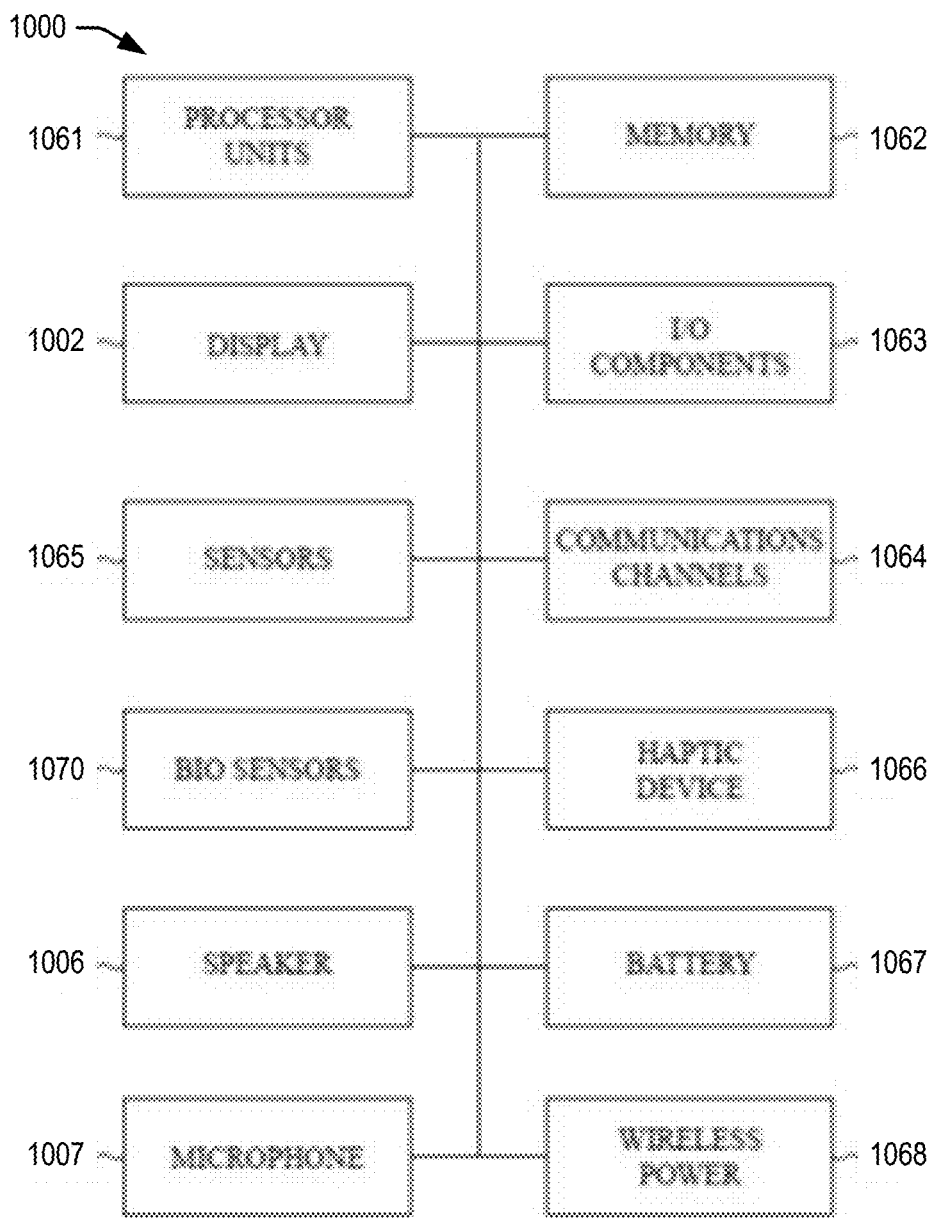
FIG. 10 is a simplified block diagram illustrating another example architecture for updating device behavior based on user behavior as described herein, according to at least one example.

FIG. 10 depicts an example schematic diagram of a wearable electronic device 1000. As shown in FIG. 10, the device 1000 includes one or more processing units 1061 that are configured to access a memory 1062 having instructions stored thereon. The instructions or computer programs may be configured to perform one or more of the operations or functions described with respect to the device 1000. For example, the instructions may be configured to control or coordinate the operation of the various components of the device. Such components include, but are not limited to, display 1002, one or more input/output components 1063, one or more communication channels 1064, one or more sensors 1065, a speaker 1006, microphone 1007, and/or one or more haptic feedback devices 1066. In some embodiments the speaker and microphone may be combined into a single unit and/or may share a common port through a housing of the device.

The processing units 1061 of FIG. 10 may be implemented as any electronic device capable of processing, receiving, or transmitting data or instructions. For example, the processing units 1061 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

In some embodiments the electronic device may accept a variety of bands, straps, or other retention mechanisms (collectively, "bands"). These bands may be removably connected to the electronic device by a lug that is accepted in a recess or other aperture within the device and locks thereto. The lug may be part of the band or may be separable (and/or separate) from the band. Generally, the lug may lock into the electronic device's recess and thereby maintain connection between the band and device. The user may release a locking mechanism to permit the lug to slide or otherwise move out of the recess. In some embodiments, the recess may be formed in the band and the lug may be affixed or incorporated into the device.

A user may change combinations of bands and electronic devices, thereby permitting mixing and matching of the two categories. It should be appreciated that devices having other forms and/or functions may include similar recesses and may releasably mate with a lug and/or band incorporating a lug. In this fashion, an ecosystem of bands and devices may be envisioned, each of which is compatible with another. A single band may be used to connect to devices, as one further example; in such embodiments the band may include electrical interconnections that permit the two devices to transmit signals to one another and thereby interact with one another.

In many embodiments, the electronic device may keep and display time, essentially functioning as a wristwatch among other things. Time may be displayed in an analog or digital format, depending on the device, its settings, and (in some cases) a user's preferences. Typically, time is displayed on a digital display stack forming part of the exterior of the device.

The display stack may include a cover element, such as a cover glass, overlying a display. The cover glass need not necessarily be formed from glass, although that is an option; it may be formed from sapphire, zirconia, alumina, chemically strengthened glass, hardened plastic and so on. Likewise, the display may be a liquid crystal display, an organic light-emitting diode display, or any other suitable display technology. Among other elements, the display stack may include a backlight in some embodiments.

The device 1000 also may comprise one or more touch sensors to determine a location of a touch on the cover glass. A touch sensor may be incorporated into or on the display stack in order to determine a location of a touch. The touch sensor may be self-capacitive in certain embodiments, mutual-capacitive in others, or a combination thereof.

Similarly, the device 1000 may include a force sensor to determine an amount of force applied to the cover glass. The force sensor may be a capacitive sensor in some embodiments and a strain sensor in other embodiments. In either embodiment, the force sensor is generally transparent and made form transparent materials, or is located beneath or away from the display in order not to interfere with the view of the display. The force sensor may, for example, take the form of two capacitive plates separated by silicone or another deformable material. As the capacitive plates move closer together under an external force, the change in capacitance may be measured and a value of the external force correlated from the capacitance change. Further, by comparing relative capacitance changes from multiple points on the force sensor, or from multiple force sensors, a location or locations at which force is exerted may be determined. In one embodiment the force sensor may take the form of a gasket extending beneath the periphery of the display. The gasket may be segmented or unitary, depending on the embodiment.

The electronic device 1000 may also provide alerts to a user. An alert may be generated in response to: a change in status of the device (one example of which is power running low); receipt of information by the device (such as receiving a message); communications between the device and another mechanism/device (such as a second type of device informing the device that a message is waiting or communication is in progress); an operational state of an application (such as, as part of a game, or when a calendar appointment is imminent) or the operating system (such as when the device powers on or shuts down); and so on. The number and types of triggers for an alert are various and far-ranging.

The alert may be auditory, visual, haptic, or a combination thereof. A haptic actuator may be housed within the device and may move linearly to generate haptic output (although in alternative embodiments the haptic actuator may be rotary or any other type). A speaker may provide auditory components of an alert and the aforementioned display may provide visual alert components. In some embodiments a dedicated light, display, or other visual output component may be used as part of an alert.

The auditory, haptic and/or visual components of the alert may be synchronized to provide an overall experience to a user. One or more components may be delayed relative to other components to create a desired synchronization between them. The components may be synchronized so that they are perceived substantially simultaneously; as one example, a haptic output may be initiated slightly before an auditory output since the haptic output may take longer to be perceived than the audio. As another example, a haptic output (or portion thereof) may be initiated substantially before the auditory output but at a weak or even subliminal level, thereby priming the wearer to receive the auditory output.

The example electronic device 1000 may communicate with other electronic devices either through a wired connection or wirelessly. Data may be passed between devices, permitting one device to relay information to another; control another; employ another's sensors, outputs, and/or inputs; and so on.

Figure 11:
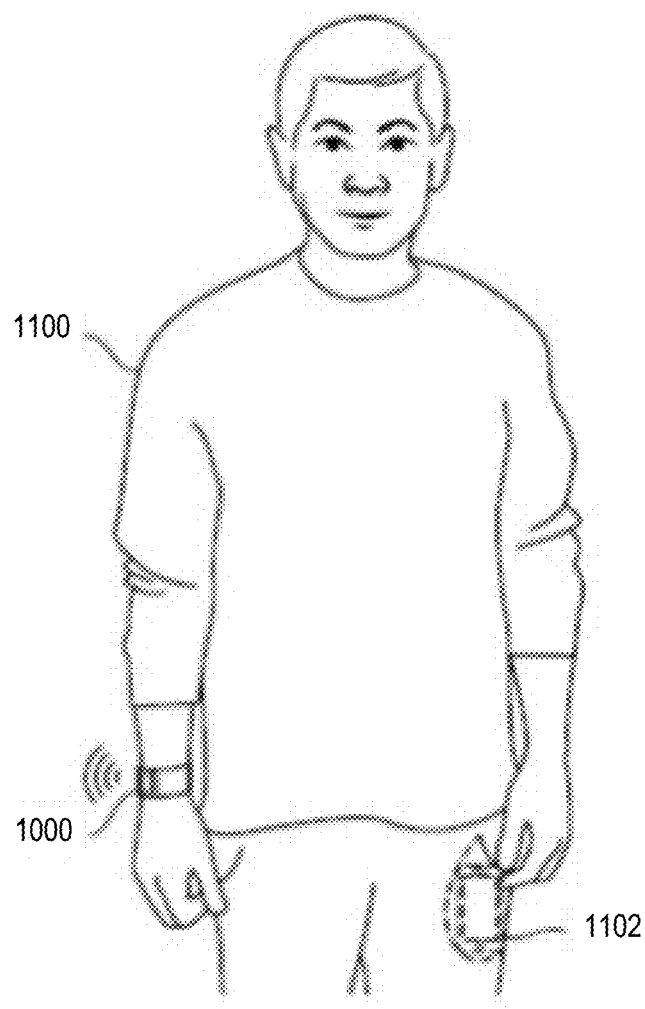
FIG. 11 is a simplified block diagram illustrating additional example devices for updating device behavior based on user behavior as described herein, according to at least one example.

FIG. 11 depicts a user 1100 wearing a sample wearable electronic device 1000 with a second (e.g., portable) electronic device 1102 in his pocket. Data may be wirelessly transmitted between the electronic devices 1000, 1102, thereby permitting the user 1100 to receive, view, and interact with data from the second device 1102 by means of the first electronic device 1000. Thus, the user 1100 may have access to part or all of the second device's functionality through the first electronic device 1000 without actually needing to interact directly with the second device 1102.

Further, the electronic devices 1000, 1102 may cooperate not only to share data but to share functionality as well. For example, one of the two devices may incorporate a sensor, application, or function that the other lacks. The electronic device lacking such capabilities may request them from the other device, which may share wirelessly with the requesting device. Thus, multiple devices may operate together to provide expanded functions, software, access and the like between the two and ultimately to a user. As one non-limiting example, the electronic device 1000 may be unable to place or receive telephone calls while the second device 1102 may be able to do so. A user may nonetheless make and/or receive calls through the first device 1000, which may employ the second device 1102 to actually place or accept a call.

As another non-limiting example, an electronic device 1000 may wirelessly communicate with a sales terminal nearby, thus permitting a user to quickly and efficiently conduct a transaction such as selling, buying, or returning a good. The electronic device may use near field communications technology to perform these and other functions.

As mentioned above, a band may be connected to two electronic devices and may serve as a wired communication path between the two. As another example, the devices may communicate wirelessly, thereby permitting one device to relay information from a second to a user. This latter example may be particularly useful when the second is inaccessible.

Certain embodiments may incorporate one or more biometric sensors to measure certain physiological characteristics of a user. The device may include a photoplesymogram sensor to determine a user's heart rate or blood oxygenation levels, for example. The device may also or instead include electrodes to measure the body impedance of a user, which may permit the device to estimate body fat percentages, the body's electrical activity, body impedance, and so on. Also include blood pressure, ultraviolet exposure, etc. Depending on the sensors incorporated into or associated with the electronic device, a variety of user characteristics may be measured and/or estimated, thereby permitting different health information to be provided to a user. In some examples, the sensed biometric information may be used by the alert manager, in part, for managing the electronic content and/or the incoming alerts.

Certain embodiments may be wirelessly charged. For example, an inductive charging base may transmit power to an inductive receiver within the device in order to charge a battery of the device. Further, by varying the inductive field between the device and base, data may be communicated between the two. As one simple non-limiting example, this may be used to wake the base from a low-power sleep state to an active charging state when the device is placed on the base. Other wireless charging systems also may be used (e.g., near field magnetic resonance and radio frequency). Alternatively, the device also may employ wired charging through electrodes.

In certain embodiments, the device may include a rotary input, which may take the form of a crown with a stem. The crown and stem may be rotated to provide the rotary input. Rotation of the stem and/or crown may be sensed optically, electrically, magnetically, or mechanically. Further, in some embodiments the crown and stem may also move laterally, thereby providing a second type of input to the device.

The electronic device may likewise include one or more buttons. The button(s) may be depressed to provide yet another input to the device. In various embodiments, the button may be a dome switch, rocker switch, electrical contact, magnetic switch, and so on. In some embodiments the button may be waterproof or otherwise sealed against the environment.

Various embodiments may include or otherwise incorporate one or more motion sensors. A motion sensor may detect motion of the device and provide, modify, cease, or otherwise affect a state, output, or input of the device or associated applications based on the motion. As non-limiting examples, a motion may be used to silence the device or acknowledge an alert generated by the device. Sample motion sensors include accelerometers, gyroscopic sensors, magnetometers, GPS sensors, distance sensors, and so on. Some embodiments may use a GPS sensor to facilitate or enable location and/or navigation assistance.

As shown in FIG. 10, the device 1000 may also include one or more acoustic elements, including a speaker 1006 and/or a microphone 1007. The speaker 1006 may include drive electronics or circuitry and may be configured to produce an audible sound or acoustic signal in response to a command or input. Similarly, the microphone 1007 may also include drive electronics or circuitry and is configured to receive an audible sound or acoustic signal in response to a command or input. The speaker 1006 and the microphone 1007 may be acoustically coupled to port or opening in the case that allows acoustic energy to pass, but may prevent the ingress of liquid and other debris.

Certain embodiments may incorporate an ambient light sensor. The ambient light sensor may permit the device to sense a brightness of its environment and adjust certain operational parameters accordingly. For example, the electronic device may modify a brightness of a display in response to the sensed ambient light. As another example, the electronic device may turn the display off if little or no light is sensed for a period of time.

These and other functions, operations, and abilities of the electronic device will be apparent upon reading the specification in its entirety.

In certain embodiments, an electronic device may include one or more haptic modules for providing haptic feedback to the user. The embodiments described herein may relate to or take the form of one or more haptic actuators suitable to provide perceivable haptic feedback. Such actuators may include an electromagnetic coil, a permanent magnet or other magnetic field source. The magnetic field may induce motion in a mass of the haptic actuator by exerting a Lorentz force on the mass when the coil is energized. A direction of current through the coil determines the direction of motion of the mass, while the strength of the magnetic field determines the velocity of the mass and thus the magnitude of the haptic output.

In general, haptic actuators implemented in some embodiments may be configured to maximize or enhance resultant mechanical energy, given a very compact form factor of the electronic device.

In one embodiment, the haptic actuator may have a mass at least partially disposed within the coil when the mass is in a rest state. This mass may include two magnets of opposing polarities implemented as a magnet array affixed within a frame; the frame may provide extra weight to the mass and thus a stronger haptic output may be generated. A shaft may extend through the mass such that the mass may freely slide on the shaft.

The magnet array may generate a radial magnetic field that interacts with the magnetic field of the coil when the coil is energized by a current. The Lorentz force resulting from the interaction of the magnetic fields causes the mass to move along a shaft in a first direction. Reversing current flow through the coil reverses the Lorentz force. As a result, the magnetic field or force on the central magnet array is also reversed and the mass may move in a second direction. Thus, mass may move in both directions along the shaft, depending on the direction of current flow through the coil. Passing an alternating current through the coil may cause the central magnet array to move back and forth along a shaft.

In order to prevent the central magnet array from being attracted to the shaft, which could increase friction between the two and thereby increase the force necessary to move the central magnet array and frame, the shaft may be formed from a non-ferritic material such as tungsten, titanium, stainless steel, or the like.

The actuator also may have structures that provide restoring force to the mass. For example, a spring may be located at either end of the shaft. As the mass impacts the spring, the spring compresses and stores kinetic energy. This kinetic energy may be released to return the mass along the shaft, thereby sending it to or near its initial starting position. The kinetic energy in the spring(s) may cooperate with the coil to move the magnet in such a fashion.

Although a linear actuator has been described herein, it should be appreciated that other types of actuators may be used in different embodiments. For example, some embodiments may employ a rotary actuator, a piezoelectric actuator, or any other suitable linear or non-linear actuator. Likewise, certain embodiments may employ multiple actuators working in concert.

Illustrative methods and systems for managing user device connections are described above. Some or all of these systems and methods may, but need not, be implemented at least partially by architectures such as those shown at least in FIGS. 1-10 above. While many of the embodiments are described above with reference to alerts and/or notifications, it should be understood that any type of electronic content may be managed using these techniques. For example, a first telephone call may be being presented, when a different incoming telephone call is received. Based at least in part on the techniques described herein, a user device may be able to determine whether to answer the incoming call and hold the first call, ignore the incoming call, overlay the incoming call, displace the initial call, or the like based at least in part on categories of the call (e.g., time of day, area code, calling party, etc.) or the like. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system configured to change a behavior of a portable computing device of a user based at least in part on instructions from a wearable computing device of the user, comprising:
   a first memory of the portable computing device configured to store first computer-executable instructions; and
   a first processor of the portable computing device in communication with the first memory, the first processor configured to execute the first computer-executable instructions to at least:
   receive, while in an active state, an incoming call initiated by another device;
   provide information to the wearable computing device relating to the incoming call;
   receive the instructions, from the wearable computing device, for changing a setting of the portable computing device based at least in part on an action taken by the user that is determined by the wearable computing device; and
   change the setting of the portable computing device to enable the user to answer the incoming call at the portable computing device; and
   a second memory of the wearable computing device configured to store second computer-executable instructions; and
   a second processor of the wearable computing device in communication with the second memory, the second processor configured to execute the second computer-executable instructions to at least:
   collect activity information of the user;
   determine, after the incoming call is received by the portable computing device, that the action is taken by the user based at least in part on the collected activity information of the user;
   generate the instructions for changing the setting of the portable computing device; and
   provide the instructions to the portable computing device to enable the setting of the portable computing device to be changed based at least in part on the identified action.

2. The system of claim 1, wherein the received instructions for updating the setting include an instruction to extend a number of rings of the incoming call or an amount of time associated with the incoming call.

3. The system of claim 2, wherein the incoming call is received from a service provider, and wherein the instruction to extend the number of rings of the incoming call are provided, by the portable computing device, to the service provider.

4. The system of claim 1, wherein the action indicates that the user is attempting to interact with the portable computing device.

5. The system of claim 1, wherein the activity information is collected by an accelerometer of the wearable computing device.

6. The system of claim 1, wherein the action indicates that an activity level of the user has increased.

7. The system of claim 6, wherein the increased activity level indicates that the user is moving faster after the incoming call is received by the portable computing device.

8. The system of claim 1, wherein the action indicates that the user is attempting to find the portable computing device.

9. The system of claim 1, wherein the portable computing device is in the active state when the portable computing device is not in a do not disturb mode.

10. The system of claim 1, wherein the wearable computing device comprises a watch or a headset capable of collecting biometric data associated with the user.

11. A computer-implemented method for updating behavior of a portable computing device in an active state, comprising:
   receiving, by a wearable computing device of a user, an incoming call initiated by an initiating device, the incoming call being received from the portable computing device of the user;
   collecting, by the wearable computing device, activity information of the user;
   determining, by the wearable computing device, that an action is taken by the user based at least in part on the collected activity information of the user after the incoming call is relayed to the wearable computing device from the portable computing device;
   generating, by the wearable computing device, instructions for changing a setting of the portable computing device based at least in part on the action taken by the user that is determined by the wearable computing device;
   providing, by the wearable computing device, the instructions to the portable computing device to enable the setting of the portable computing device to be changed based at least in part on the action; and identifying, by the wearable computing device, that the portable computing device has changed the setting to enable the user to answer the incoming call at the portable computing device.

12. The computer-implemented method of claim 11, wherein the action identifies that the user is attempting to answer the call.

13. The computer-implemented method of claim 11, wherein the changed setting of the portable computing device comprises extending a number of rings of the portable computing device.

14. The computer-implemented method of claim 13, wherein the number of rings of the portable computing device is extended by providing instructions to a service provider that instruct the service provider to extend the number of rings prior to enabling a voice message service.

15. A computer-implemented method for updating behavior of a portable computing device of a user, comprising:
receiving, by the portable computing device, an incoming call initiated by an initiating device;
providing, by the portable computing device, information to a wearable computing device relating to the incoming call;
receiving, by the portable computing device, instructions from the wearable computing device for changing a setting of the portable computing device based at least in part on an action taken by the user that is determined by the wearable computing device after the information relating to the incoming call is provided to the wearable computing device; and
changing, by the portable computing device, the setting of the portable computing device to enable the user to answer the incoming call at the portable computing device.

16. The computer-implemented method of claim 15, wherein changing the setting configures the portable computing device to provide a message to the initiating device.

17. The computer-implemented method of claim 16, wherein the message comprises a request to the initiating device, the request enabling a second user associated with the initiating device to indicate a relative importance of the incoming call.

18. The computer-implemented method of claim 17, further comprising receiving, by the portable computing device, the indication of the relative importance of the incoming call.

19. The computer-implemented method of claim 16, wherein the message is configured to indicate to the second user that the user is attempting to answer the incoming call.

* * * * *